United States Patent [19]

Strosberg et al.

[11] Patent Number: 4,888,919
[45] Date of Patent: Dec. 26, 1989

[54] CLOSURE PANEL FOR AUTOMATIVE BODIES

[75] Inventors: Gordon G. Strosberg, Southfield; Adam M. Janotik, Grosse Ile; Derek F. Gentle, Birmingham, all of Mich.

[73] Assignee: Ford Motor Company, Dearborn, Mich.

[21] Appl. No.: 296,102

[22] Filed: Jan. 12, 1989

[51] Int. Cl.[4] .............................. B60J 5/04
[52] U.S. Cl. ..................... 49/502; 49/401; 49/488; 49/506; 29/509; 296/146
[58] Field of Search ............... 49/502, 501, 488, 506, 49/400, 401; 296/146; 29/509

[56] References Cited

U.S. PATENT DOCUMENTS

| | | |
|---|---|---|
| 3,466,727 | 9/1969 | Buker et al. |
| 3,909,918 | 10/1975 | Takizawa et al. |
| 4,258,950 | 3/1981 | Itoh et al. |
| 4,306,380 | 12/1981 | Vettel |
| 4,392,295 | 7/1983 | Sasai et al. |
| 4,455,785 | 6/1984 | Wahr et al. |
| 4,457,111 | 7/1984 | Koike ........................ 49/502 X |
| 4,496,186 | 1/1985 | Tuchiya et al. ............ 296/146 |
| 4,549,761 | 10/1985 | Lee et al. ................ 296/146 X |
| 4,581,851 | 4/1986 | Warner ...................... 49/502 X |
| 4,592,586 | 6/1986 | Yagami et al. |
| 4,593,494 | 6/1986 | Ono et al. .................. 49/502 X |
| 4,635,947 | 1/1987 | Hatayama |
| 4,689,916 | 9/1987 | Shimizu ..................... 49/502 X |
| 4,694,611 | 9/1987 | Okumura .................... 49/502 X |

Primary Examiner—Philip C. Kannan
Attorney, Agent, or Firm—Daniel M. Stock; Roger L. May

[57] ABSTRACT

An improved construction for an automotive vehicle door provides an upstanding peripherally extending mounting flange formed integrally with the outer panel of the door for carrying a resilient seal for sealing engagement with the vehicle body when the door is in a closed position.

12 Claims, 2 Drawing Sheets

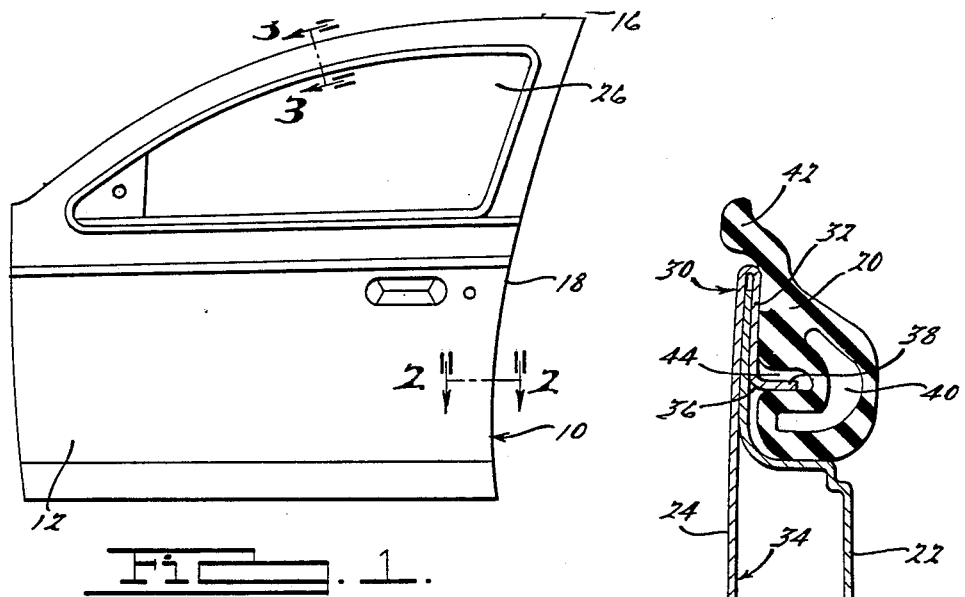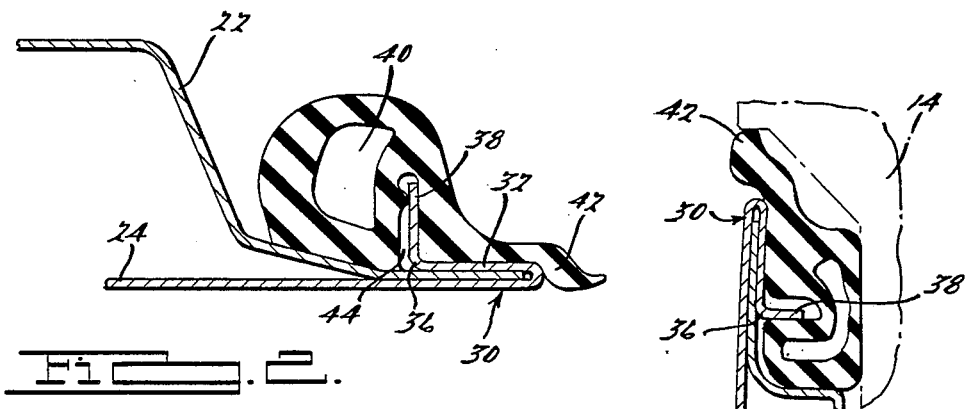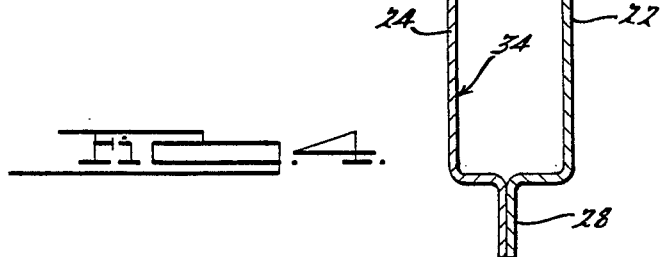

CLOSURE PANEL FOR AUTOMATIVE BODIES

BACKGROUND OF THE INVENTION

The present invention relates generally to automotive body closure panels, such as doors, and more particularly to constructional features of such panels or doors utilized to cooperate with sealing elements for effecting weathertight seals between the doors and adjacent portions of the automotive vehicle body.

It has been customary in the automotive industry to mount the weatherseals for automotive vehicle doors on the vehicle body structure itself in peripherally surrounding relationship with respect to the aperture closed by the door. In some instances, this results in an aesthetically unpleasing appearance resulting from the placement of the usually-black weatherseal against a clean painted body. Functional problems relating to wind noise and the effecting of a close seal against the facing surface of the door are also noticed in some instances.

The mounting of the weatherseal member on the door as opposed to the vehicle body has been proposed as a solution to these problems. Weatherseals have been mounted to the doors through agency of adhesives or mechanical fasteners, such as clips and the like, applied to the door to retain the weatherseal. The handling of such adhesives and fasteners in the assembly plant is a time-consuming and laborious task making weatherseal positioning on vehicle doors disadvantageous.

SUMMARY OF THE INVENTION

The present invention is directed at realizing the advantages of mounting a weatherseal on an automotive door through an advantageous door construction permitting the simple installation of a weatherseal on the door without the use of other assembly materials. The new door construction provides an upstanding flange at the outer periphery of the door for receiving a weatherseal insertable over the flange.

In a preferred door construction, the door is formed of inner and outer panels joined to one another at their outer peripheries by a hem flange in which the outer panel clinchingly engages the outer periphery of the inner panel. An upstanding flange for mounting the weatherseal may be integrally manufactured with the outer panel by successive strikes in the stamping process which form the upstanding flange at the terminus of the outer body panel portion used to form the hem flange.

BRIEF DESCRIPTION OF THE DRAWINGS

The advantages of the construction of the automotive body closure panel of the present invention over constructions known in the prior art will become apparent on reading the following description with reference to the accompanying drawings in which:

FIG. 1 is a side view of an automotive door assembly according to the present invention;

FIG. 2 is a cross-sectional view of the door of FIG. 1 taken along lines 2—2 of FIG. 1;

FIG. 3 is a cross-sectional view of the door of FIG. 1 in its open position taken along lines 3—3 of FIG. 1;

FIG. 4 is a cross-sectional view similar to FIG. 3 the door in the closed position.

DESCRIPTION OF THE PREFERRED EMBODIMENT

Figure 5:
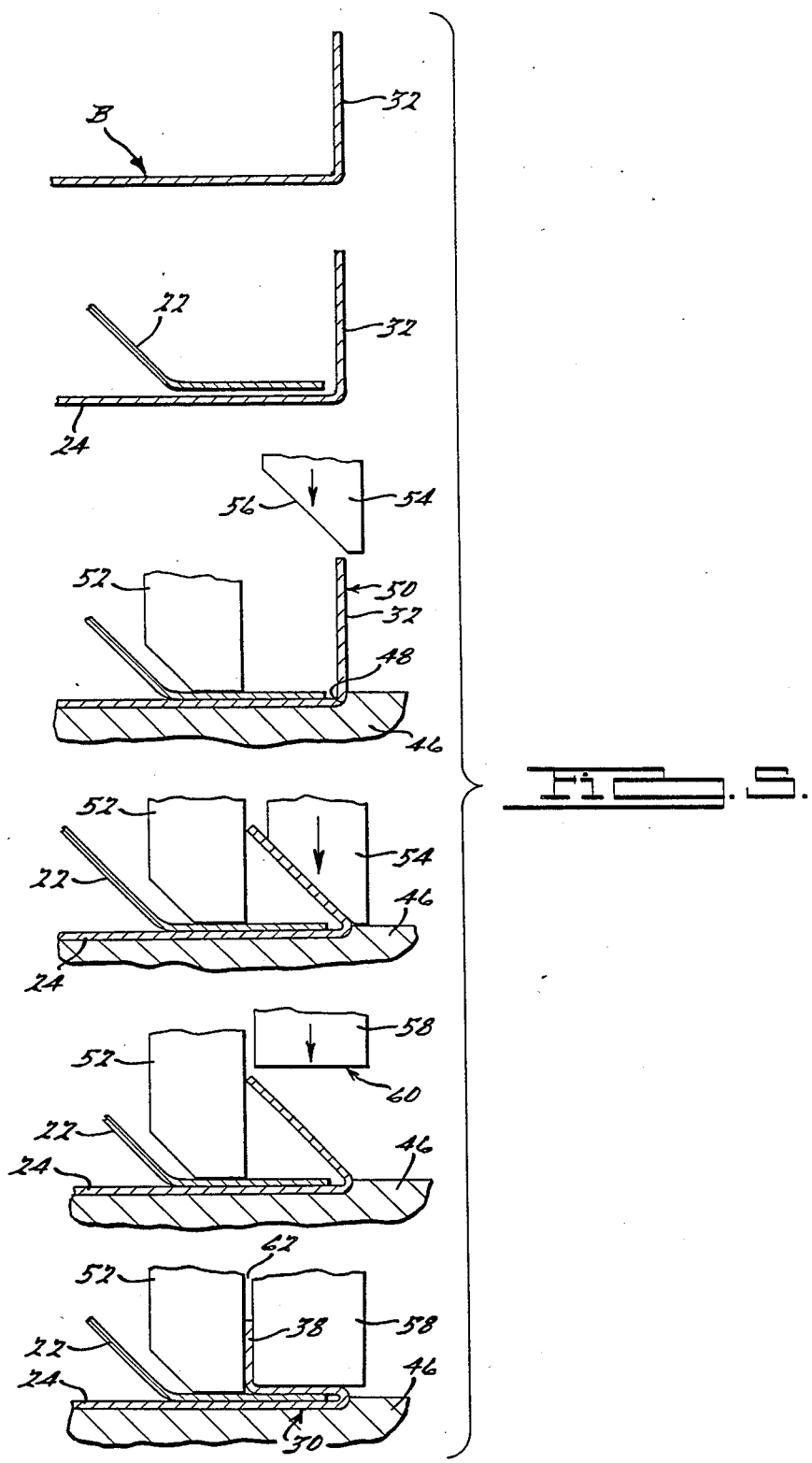
FIG 5 is a series of views illustrating the fabrication of the upstanding seal mounting flange of the door of the present invention.

Turning now to the drawings, an automobile door 10 according to the present invention is illustrated, the door being of the type constructed in known fashion to be mounted for swingable movement about its front peripheral edge 12 with respect to an automobile body 14, a portion of which is shown in dotted line in FIG. 4.

According to the present invention, peripheral edges of the door 10, such as a top peripheral edge 16 and a rear peripheral edge, are configured to form a door assembly including a resilient seal member 20. The seal member 20 is suitably configured to effect sealing engagement between the door 10 and the body 14 when the door 10 is moved from an open condition to a closed condition with respect to the typical aperture formed through the vehicle body for facilitating ingress and egress of passengers and goods.

The door 10 is peripherally formed of hollow beam construction including an inner panel 22 and an outer panel 24. The panels 22, 24 may be secured together adjacent a window aperture 26 as by a pinch weld flange indicated at 28 in FIGS. 3 and 4. At the outer peripheral edges of the inner and outer panels 22, 24, respectively, attachment is preferably effected by use of a hem flange, as indicated generally at 30. At the hem flange 30, the outer panel 24 clinchingly engages the inner panel 22. An inwardly turned leg portion 32 of the hem flange 30 abuts the inner surface 34 of the outer panel 24. At inner end 36 of the leg 32, an upstanding mounting flange 38 is formed which extends perpendicularly inwardly with respect to the door 10 toward the body 14.

The seal member 20 is formed as a resilient member of an natural or synthetic elastomer and preferably includes a hollow bulbous portion 40 extending throughout its length. A sealing foot 42 extends obliquely from the bulbous portion 40, and a substantially centrally located mounting slot 44 for receiving the upstanding mounting flange 38 which is formed on the outer panel 24 proximate its outer periphery. Upon swinging the door 10 from its open to its closed position, the seal member 20 is brought into sealing engagement with body 14 compressing the bulbous portion 40, as well as the sealing leg 42 with appropriately configured portions of the body 14, as may best be seen in FIG. 4.

When the inner and outer panels 22, 24, respectively, are fabricated as stamped sheet metal parts, the outer panel 24 may be constructed with the upstanding mounting flange 38 formed integrally with it according to the method illustrated in the views of FIG. 5.

In fabricating an outer panel for a door such as illustrated at 10 in FIG. 1, the blank from which the outer panel 24 is stamped must be sized to include the additional material necessary to form the upstanding flange 38. After the offal is trimmed from this outer panel blank, indicated generally at B in FIG. 5, the blank B is struck to turn up its outer edge to form the leg 32. The leg 32 at this stage of the stamping process is extending perpendicularly away from the inner surface 34 of the outer panel 24.

In the next operation, the inner panel 22 is brought into mating engagement with the outer panel 24 with its outer periphery placed proximate the leg 32. The mated inner and outer panels 22, 24, respectively, which may be secured together, are then placed in a fixture base 46, having surfaces configured to abuttingly engage the outer surfaces of the outer panel 24, including an abutment, as indicated at 48, for engaging the outer surface 50 of the leg 32. A die 52 is then moved toward the fixture base 46 into clamping engagement with the inner surface of the inner panel 22.

Next, a second die 54 having a canted face 56 is moved against the leg 32 to rotate it inwardly toward the die 52. Finally, a third die 58 having a flat leading edge 60 is used to strike the leg 32, bringing it into clinching engagement with the inner panel 22 while forming the upstanding mounting flange 38 at the separation 62 between the dies 52, 58.

While only one embodiment of the improved closure panel construction of the present invention and method for making that construction have been described, others may be possible without departing from the scope of the following claims.

We claim:

1. A door assembly swingably mountable on an automobile body to open and close an aperture formed through the body, the door being of the type formed from an inner and an outer panel secured together at their outer peripheries, the door assembly comprising:
    an upturned flange integrally formed with one of the panels proximate the outer periphery thereof and extending toward the body;
    and a seal member mounted on the flange for sealing engagement with the body when the door assembly is swung closed with respect to the body aperture.

2. A closure panel for an automobile body, the body having an aperture formed through it and the closure panel being mounted for swingable movement about one edge of the aperture, the closure panel comprising:
    an inner panel,
    an outer panel having a hem flange portion clinchingly engaging outer peripheral surfaces of the inner panel, the outer panel hem flange portion including an inwardly extending leg engaging the inner face of the inner panel and,
    an upstanding mounting flange integrally formed at the inner end of the inwardly extending leg.

3. A closure panel as defined in claim 2, and further comprising a seal member mounted on the upstanding mounting flange and having sealing surfaces sealingly engaging the automobile body.

4. A closure panel as defined in claim 3, wherein the sealing surfaces comprise a lip seal portion engageable with portions of the vehicle body outwardly peripherally adjacent the body aperture.

5. A closure panel as defined in claim 3, wherein the sealing surfaces comprise a bulbous portion compressively sealingly engageable against the body aperture flange.

6. A closure panel as defined in claim 5, wherein the sealing surfaces further comprise a lip seal portion engageable with portions of the vehicle body outwardly peripherally adjacent the body aperture.

7. A door for an automobile body, the body having a aperture formed through it and the door being mounted for swingable movement about one edge of the aperture, the door comprising:
    an inner panel,
    an outer panel having a hem flange portion clinchingly engaging outer peripheral surfaces of the inner panel, the outer panel hem flange portion including an inwardly extending leg engaging the inner face of the inner panel, and
    an upstanding mounting flange projecting from the door toward the body and integrally formed at the inner end of the inwardly extending leg.

8. A door as defined in claim 7, and further comprising a seal member mounted on the upstanding mounting flange and having sealing surfaces sealingly engaging the automobile body.

9. A door as defined in claim 8, wherein the sealing surfaces comprise a lip seal portion engageable with portions of the vehicle body outwardly peripherally adjacent the body aperture.

10. A door as defined in claim 8, wherein the sealing surfaces comprise a bulb portion compressively sealingly engageable against the body aperture flange.

11. A door as defined in claim, 10, wherein the sealing surfaces further comprise a lip seal portion engageable with portions of the vehicle body outwardly peripherally adjacent the body aperture.

12. A method of forming a hem flange for an automotive body closure panel, the hem flange providing an upstanding mounting flange for carrying a seal member, the method comprising the steps of:
    providing a first flat sheet metal panel having inner and outer faces,
    stamping the first panel to form a leg at its outer periphery extending substantially perpendicularly inwardly from the first panel inner surface,
    placing the first panel in a fixture base having an abutment engaging the outer surface of the leg,
    placing a flat portion of a second sheet metal panel in flat abutting contact with the inner surface of the first panel and in approximately peripheral abutting relationship with the inner surface of the leg,
    moving a first die into clamping engagement with the inner surface of the inner panel,
    striking the leg with a second die having a canted face while the first die is held in clamping engagement to bend the leg toward the first die by engagement with the canted face, and
    removing the second die and striking the leg with a third die having a flat face and spaced from the first die to simultaneously form the leg into clinching engagement with the second panel while forming the upstanding mounting flange at the free end of the leg extending perpendicularly from the inner face of the inner panel.

* * * * *